United States Patent [19]

Hunter

[11] 4,164,737

[45] Aug. 14, 1979

[54] DIRECTIONAL TRAILER TURNING SIGNALING DEVICE

[75] Inventor: Robert H. Hunter, Mesquite, Tex.

[73] Assignee: Trailer Eye, Inc., Dallas, Tex.

[21] Appl. No.: 835,658

[22] Filed: Sep. 22, 1977

[51] Int. Cl.² .............................................. B60Q 1/00
[52] U.S. Cl. .................................... 340/686; 180/271; 340/52 R
[58] Field of Search .................... 340/282, 52 R, 686; 180/103, 103 R

[56] References Cited

U.S. PATENT DOCUMENTS

| | | | |
|---|---|---|---|
| 3,588,809 | 6/1971 | Devlin | 340/52 R |
| 3,833,928 | 9/1974 | Gavit et al. | 340/282 |

Primary Examiner—Glen R. Swann, III
Attorney, Agent, or Firm—Roy, Kiesel, Patterson & Abadie

[57] ABSTRACT

A directional trailer turning signaling device for use on a vehicle having a trailer attached thereto comprises a frame assembly mounted on the vehicle's trailer hitch, a contact arm in pivotable contact with the trailer's tongue attached to the hitch, a sensing means attached to the frame assembly and connected to the contact arm to detect the degree of its rotation, and an indication gauge mounted in the vehicle near the driver and connected to the sensing means for providing visual indication of the trailer position behind the vehicle.

4 Claims, 5 Drawing Figures

DIRECTIONAL TRAILER TURNING SIGNALING DEVICE

BACKGROUND OF THE INVENTION

1. Field of the Invention

This invention relates to a device for indicating in which direction a trailer attached to a vehicle is turning.

2. Prior Art

One of the most difficult driving maneuvers that a driver must make is to back up his vehicle with a trailer attached, particularly, if turning is involved. Normally, the driver is not used to the backing up maneuvers or he is unable to see just how the trailer has turned.

SUMMARY OF THE INVENTION

Therefore, one object of this invention is to provide a device which can assist a vehicle driver in backing up when a trailer is attached to his vehicle.

This and other advantages and objects of this invention will become apparent from the ensuing descriptions of the invention.

Accordingly, a directional trailer turning signaling device is disclosed comprising a frame assembly mounted on the vehicle's trailer hitch, a contact arm in pivotable contact with the trailer's tongue, a sensing means attached to the frame assembly and connected to the contact arm to detect the degree of its rotation, and an indicator gauge mounted in the vehicle near the driver and connected to the sensing means for providing visual indication of the trailer position behind the vehicle.

PREFERRED EMBODIMENTS OF THE INVENTION

Figure 1:
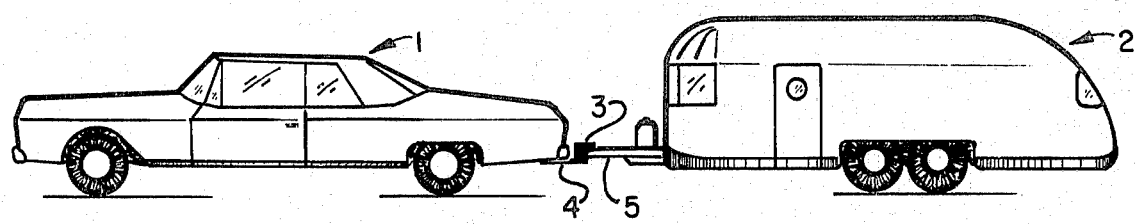
FIG. 1 is a perspective view of the device of this invention mounted on the trailer hitch of a car pulling a camper.

When backing up an auto 1 having a trailer 2 attached thereto, it is difficult for the driver to gauge the degree to which trailer 2 is turned. This problem can be reduced or eliminated by attaching the directional trailer turning signaling device 3 to the trailer hitch 4 and about the trailer tongue 5 as described hereinbelow.

Figure 2:
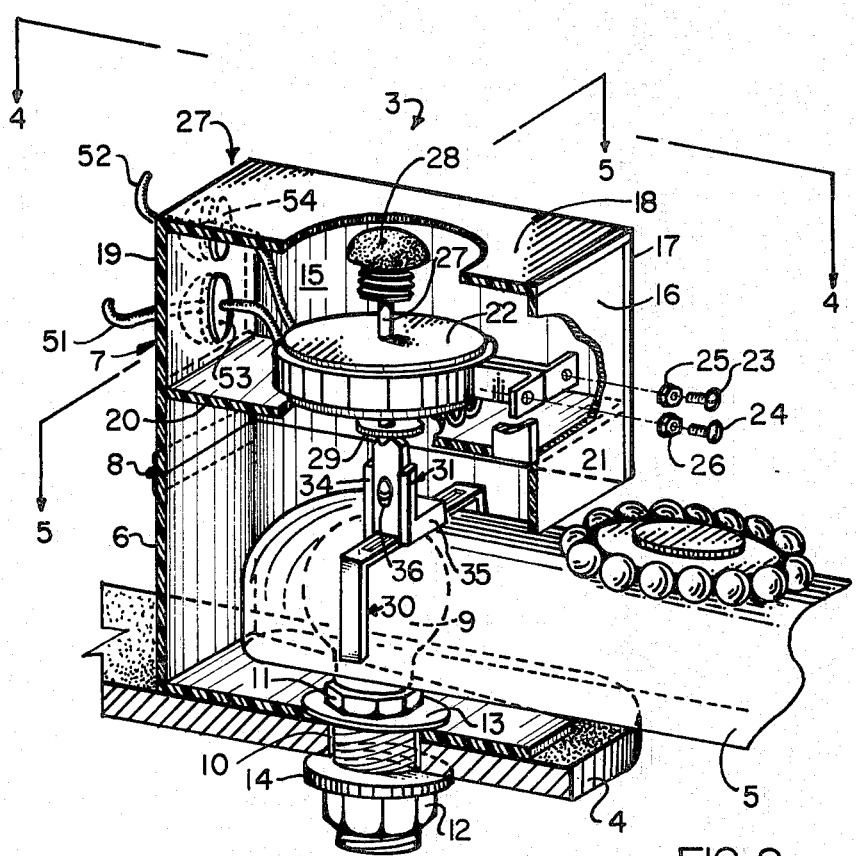
FIG. 2 is a cutaway perspective view of one embodiment of the device of this invention.

Device 3 has a frame assembly attachable to trailer hitch 4. In the preferred embodiment shown in FIG. 2, the frame assembly comprises an L-shaped metal bar 6 to which is attached top box section 7 by way of hinge 8 as shown. Bar 6 is attached to hitch 4 by passing trailer ball 9 through bar opening 10 and then tightening in a conventional manner bar 6 to hitch 4 by bolts 11, 12 and washers 13, 14. There are, of course, many alternate methods for attaching bar 6 to hitch 4 such as, by way of example, welding, etc.

Figure 4:
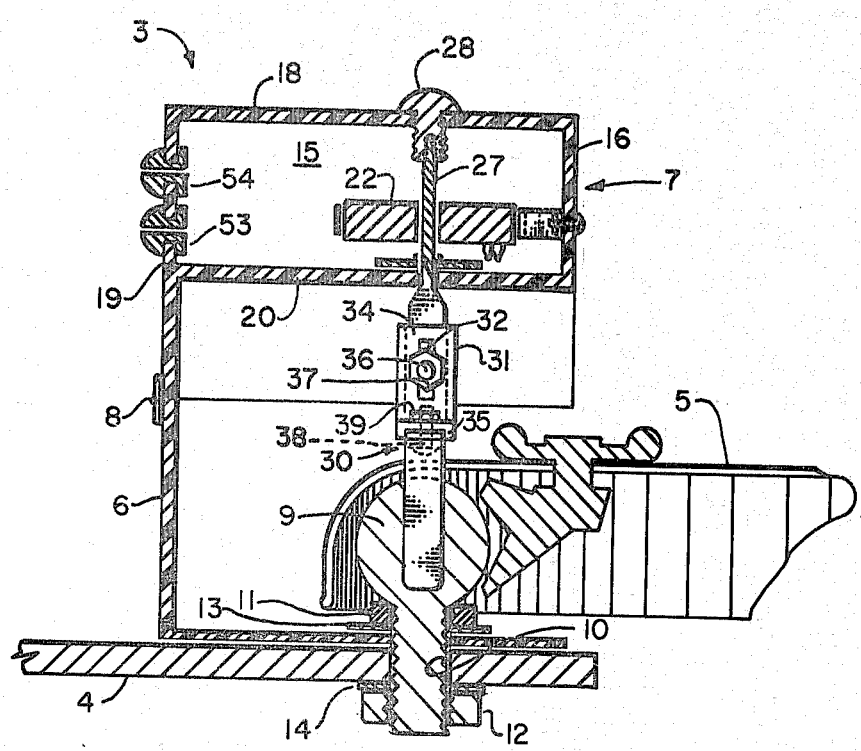
FIG. 4 is a cross-sectional view taken along lines 4—4 of FIG. 2.
Figure 5:
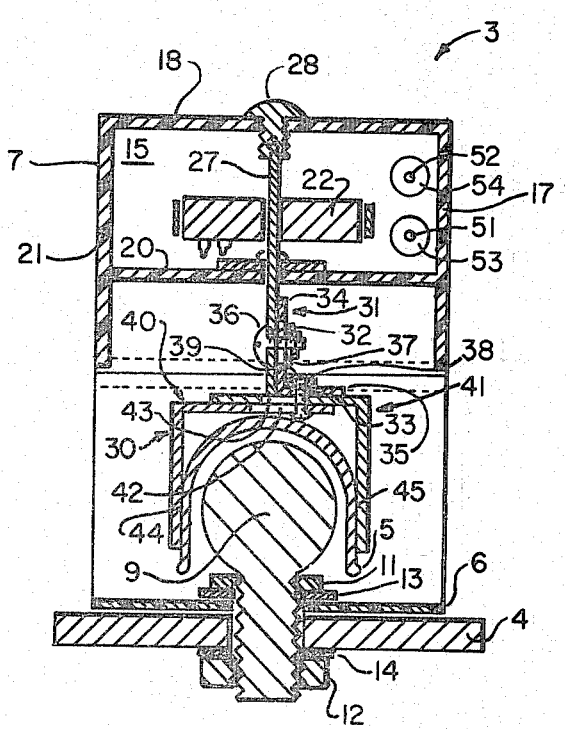
FIG. 5 is a cross-sectional view taken along lines 5—5 of FIG. 2.

Box section 7 has cavity 15 formed by wall members 16, 17, 18, 19, 20 and 21 in which a potentiometer 22 is located and attached to wall member 16 by bolts 23, 24 and bolts 25, 26 as shown. Extending through potentiometer 22 is turning member 27 which is attached at one end to positioning screw 28 which extend through wall member 18 as illustrated in FIGS. 4 and 5. Turning member 27 extends downward through sealing washer 29 and wall member 20 where it is attached at its other end to contact arm 30 by L-member 31. In a preferred embodiment, member 31 is provided with slots 32, 33 in sections 34, 35, respectively. L-member 31 is attached to turning member 27 by bolt 36 and nut 37 as shown. In like manner, L-member 31 is attached to contact arm 30 by bolt 38 and nut 39.

In a preferred embodiment, as seen in FIG. 5, contact arm 30 is constructed from L-shaped metal bars 40, 41, having slots 42, 43, respectively, through which bolt 38 passes. By utilizing slots 42, 43, the distance between arm sections 44, 45 can be adjusted to fit snugly in contact with trailer tongue 5.

Figure 3:
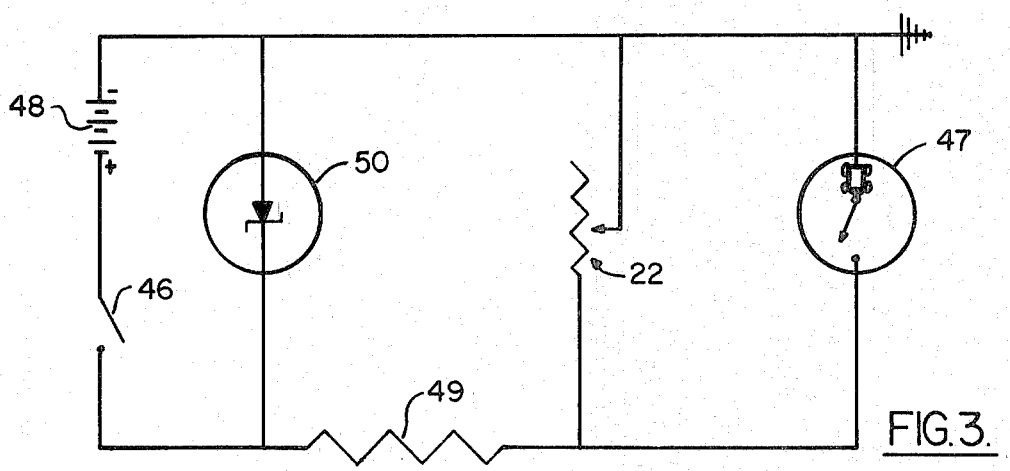
FIG. 3 is a schematic drawing of one embodiment of this invention.

In operation, bar 6 is attached to hitch 4. Box 7 is then tilted up and back on hinge 8 so as not to obstruct the positioning of tongue 5 on ball 9. After the trailer 2 has been secured to auto 1, box 7 is tilted forward and arm sections 44, 45 are adjusted to fit snugly in contact with tongue 5. Next, device 3 is activated by pushing switch 46 to complete the electrical circuit shown in FIG. 3. The reading on the volt meter 47 is adjusted to read "0" when trailer 2 is aligned directly behind auto 1 by turning an adjusting screw on volt meter 47 to change the setting on potentiometer 22. Device 3 is now in position to operate. As trailer 2 is turned, tongue 5 also turns forcing the rotation of turning member 27, which changes the voltage drop across potentiometer 22. This change in voltage drop is visually recorded by volt meter 47, which can be calibrated to show the direction and degree that trailer 2 has been turned and/or the direction in which the auto steering wheel must be turned to straighten out trailer 2.

When utilizing the conventional auto 12-volt battery 48 as the power source, it is preferred that a 10K ohm resistor 49 be placed in series between battery 48 and potentiometer 22 (such as 1K volt potentiometer) to reduce the voltage to about 3.5 volts. It is also preferred that a diode 50, such as a Zener diode, be connected in the circuit as shown to steady the voltage in the circuit. It is also preferred that connecting wires 51, 52 attached to the potentiometer 22 pass through gromets 53, 54 when leading out of box 7 in order to keep box cavity 15 sealed.

There are, of course, many alternate embodiments not specifically disclosed, but which are intended to be included within the scope of this invention as defined in the following claims.

What I claim is:

1. A directional turning signaling device mountable on a vehicle trailer hitch to determine a trailer's position behind the vehicle, said trailer being attached by a tongue to a ball of the trailer hitch which comprises:
   (a) a frame assembly mounted on the hitch, said frame assembly comprising an L-shaped bar attached to the hitch and a top box hingedly attached to the bar to enable the box to tilt upward and away from the ball;
   (b) a contact arm in contact with the tongue to pivot with the tongue about the ball and connected to a sensing means for determining the amount of pivoting by the contact arm, the sensing means being attached to the frame assembly; and (c) an indicator gauge mounted in the vehicle and connected to the sensing means for providing visual indication of the trailer position behind the vehicle.

2. A device according to claim 1 wherein the box is provided with a cavity formed by side, top and bottom walls and wherein the sensing device is located within the cavity.

3. A directional turning signaling device mountable on a vehicle trailer hitch to determine a trailer's position behind the vehicle, said trailer being attached by a tongue to a ball of the trailer hitch which comprises:
(a) a frame assembly mounted on the hitch;
(b) a contact arm in contact with the tongue to pivot with the tongue about the ball and connected to a sensing means for determining the amount of pivoting by the contact arm, the sensing means being attached to the frame assembly, said contact arm comprising two arm sections adjustably secured to one another to fit snugly in contact with the tongue; and
(c) an indicator gauge mounted in the vehicle and connected to the sensing means for providing visual indication of the trailer position behind the vehicle.

4. A directional turning signaling device mountable on a vehicle trailer hitch to determine a trailer's position behind the vehicle, said trailer being attached by a tongue to a ball of the trailer hitch which comprises:
(a) a frame assembly mounted on the hitch;
(b) a contact arm in contact with the tongue to pivot with the tongue about the ball and connected to a potentiometer for determining the amount of the pivoting by the contact arm, the potentiometer being attached to the frame assembly; and
(c) a volt meter mounted in the vehicle and connected to the potentiometer for providing visual indication of the trailer position behind the vehicle.

* * * * *